United States Patent
Ferer et al.

(10) Patent No.: US 6,796,600 B1
(45) Date of Patent: Sep. 28, 2004

(54) VEHICLE BODY WITH PRE-HUNG MIDGATE PANEL

(75) Inventors: Robert Martin Ferer, Clarkston, MI (US); John J. Mascarello, Livonia, MI (US); Ajay Mahesh Kharod, Rochester Hills, MI (US); Andrew J. Novajovsky, Grand Blanc, MI (US); William Charles Bisnack, Sterling Hts., MI (US); David Thomas Renke, Macomb, MI (US); Vincent L. Ruma, Clarkston, MI (US); Carlos N. Czirmer, Rochester, MI (US); Richard J. Lange, Troy, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/443,312

(22) Filed: May 22, 2003

(51) Int. Cl.[7] .................................................. B60J 1/08
(52) U.S. Cl. ............................... 296/146.1; 296/190.11; 296/37.6
(58) Field of Search .............................. 296/146.1, 37.6, 296/190.11, 146.5, 146.15, 146.16, 26.02, 26.08, 26.1, 26.11, 37.16, 57.1, 147, 146.2, 145, 190.1, 183, 193.08, 193.04

(56) References Cited

U.S. PATENT DOCUMENTS

| | | | | |
|---|---|---|---|---|
| 4,480,868 A | * | 11/1984 | Koto | 296/190.11 |
| 4,941,702 A | * | 7/1990 | Southward | 296/190.11 |
| 5,427,425 A | * | 6/1995 | Droesch | 296/50 |
| 5,934,727 A | * | 8/1999 | Storc et al. | 296/26.11 |
| 6,260,916 B1 | * | 7/2001 | Hunt | 296/190.11 |
| 6,276,751 B1 | * | 8/2001 | Ikarashi et al. | 296/190.11 |
| 6,398,291 B1 | * | 6/2002 | Reusswig et al. | 296/190.11 |
| 6,416,104 B1 | * | 7/2002 | Fisher et al. | 296/190.11 |
| 6,419,299 B1 | * | 7/2002 | Pyo | 296/190.11 |
| 6,450,566 B1 | * | 9/2002 | Hong | 296/190.11 |
| 6,478,355 B1 | * | 11/2002 | Van Eden et al. | 296/37.6 |
| 6,505,872 B2 | * | 1/2003 | Hong | 296/190.11 |
| 6,513,863 B1 | * | 2/2003 | Renke et al. | 296/190.11 |
| 6,520,562 B2 | * | 2/2003 | Pyo | 296/190.11 |
| 6,550,849 B1 | * | 4/2003 | Dosdall | 296/190.11 |
| 6,554,339 B1 | * | 4/2003 | Moore | 296/24.1 |
| 6,582,012 B1 | * | 6/2003 | Smith | 296/190.11 |
| 6,619,723 B2 | * | 9/2003 | Duffy | 296/190.11 |
| 2002/0070573 A1 | * | 6/2002 | Song | 296/37.6 |
| 2003/0122402 A1 | * | 7/2003 | Takahashi | 296/190.11 |

* cited by examiner

*Primary Examiner*—Kiran Patel
(74) *Attorney, Agent, or Firm*—Laura C. Hargitt

(57) ABSTRACT

A vehicle body includes a first compartment for carrying passengers or cargo and second compartment for carrying cargo rearwardly adjacent to the first compartment. The body includes a plurality of body components defining an opening between the first and second compartments. A structural support ring is attached in the opening and includes a pivotable midgate panel preassembled to the support ring to ease installation. At least one hinge is pivotably connected between the midgate panel and the support ring. At least one latch selectively secures the midgate panel in an upright closed position.

6 Claims, 16 Drawing Sheets

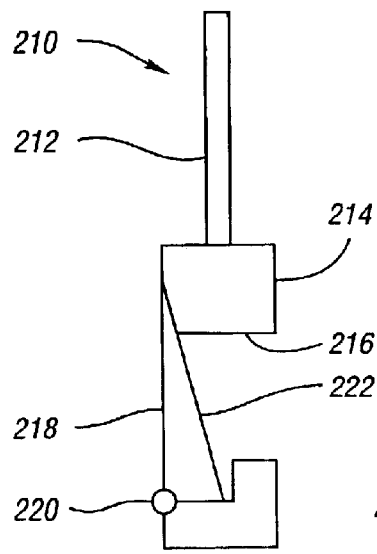
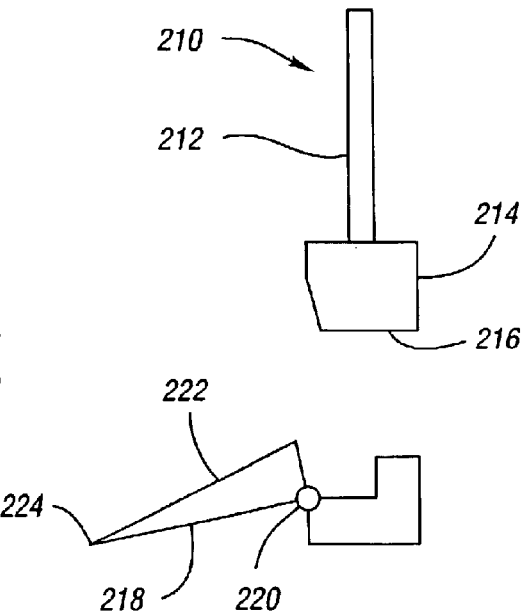
Fig. 7a      Fig. 7b
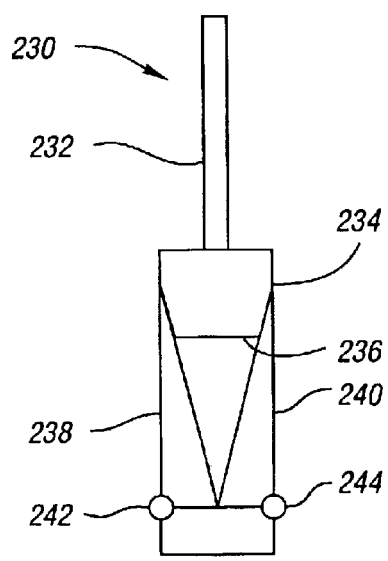
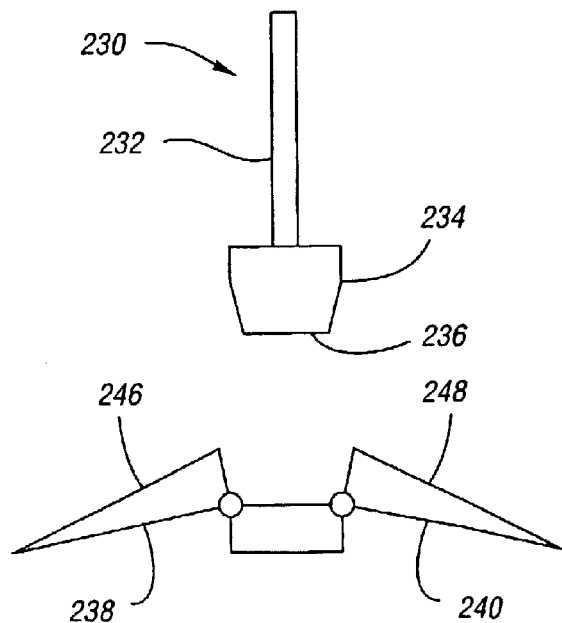
Fig. 8a      Fig. 8b

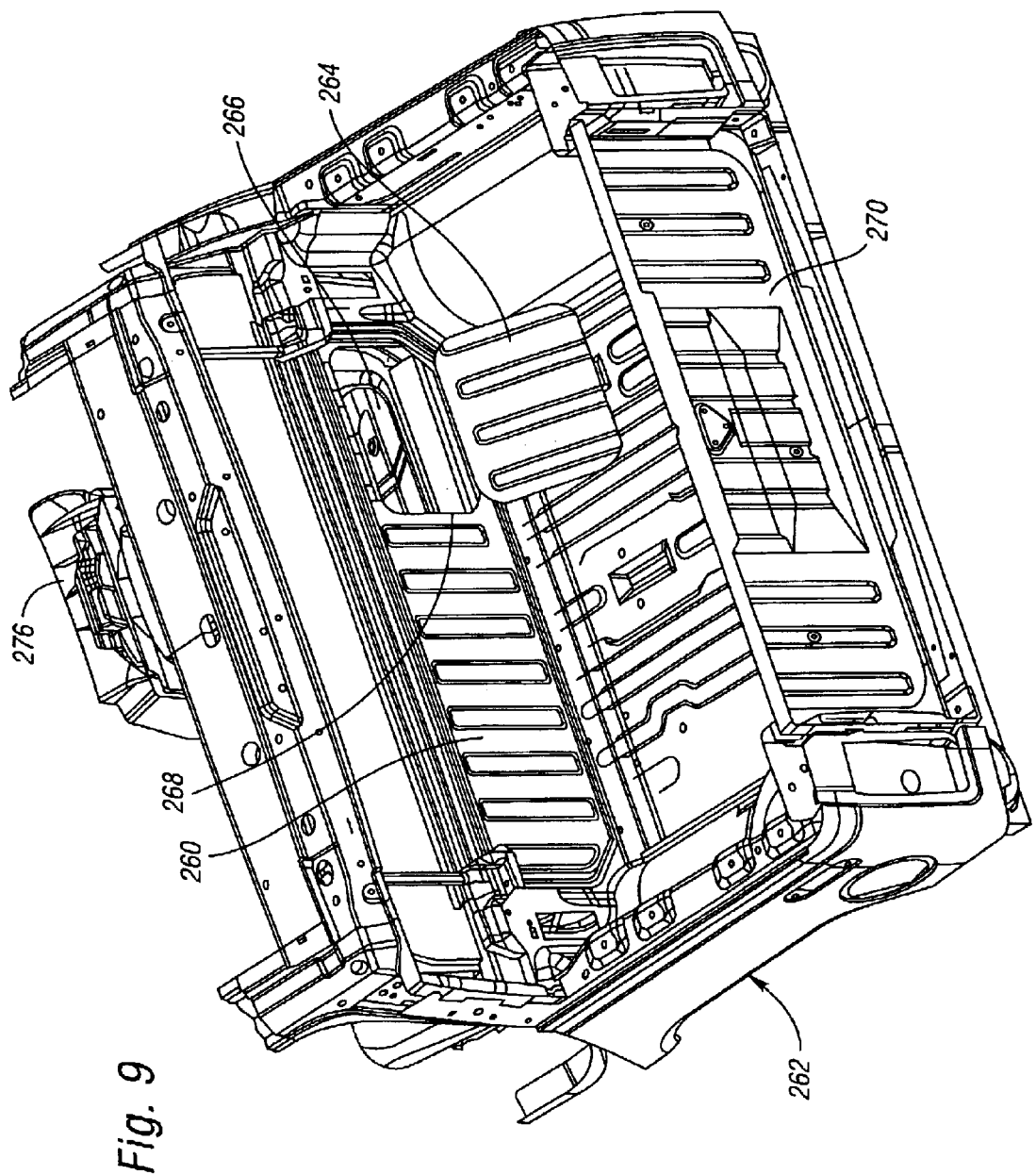

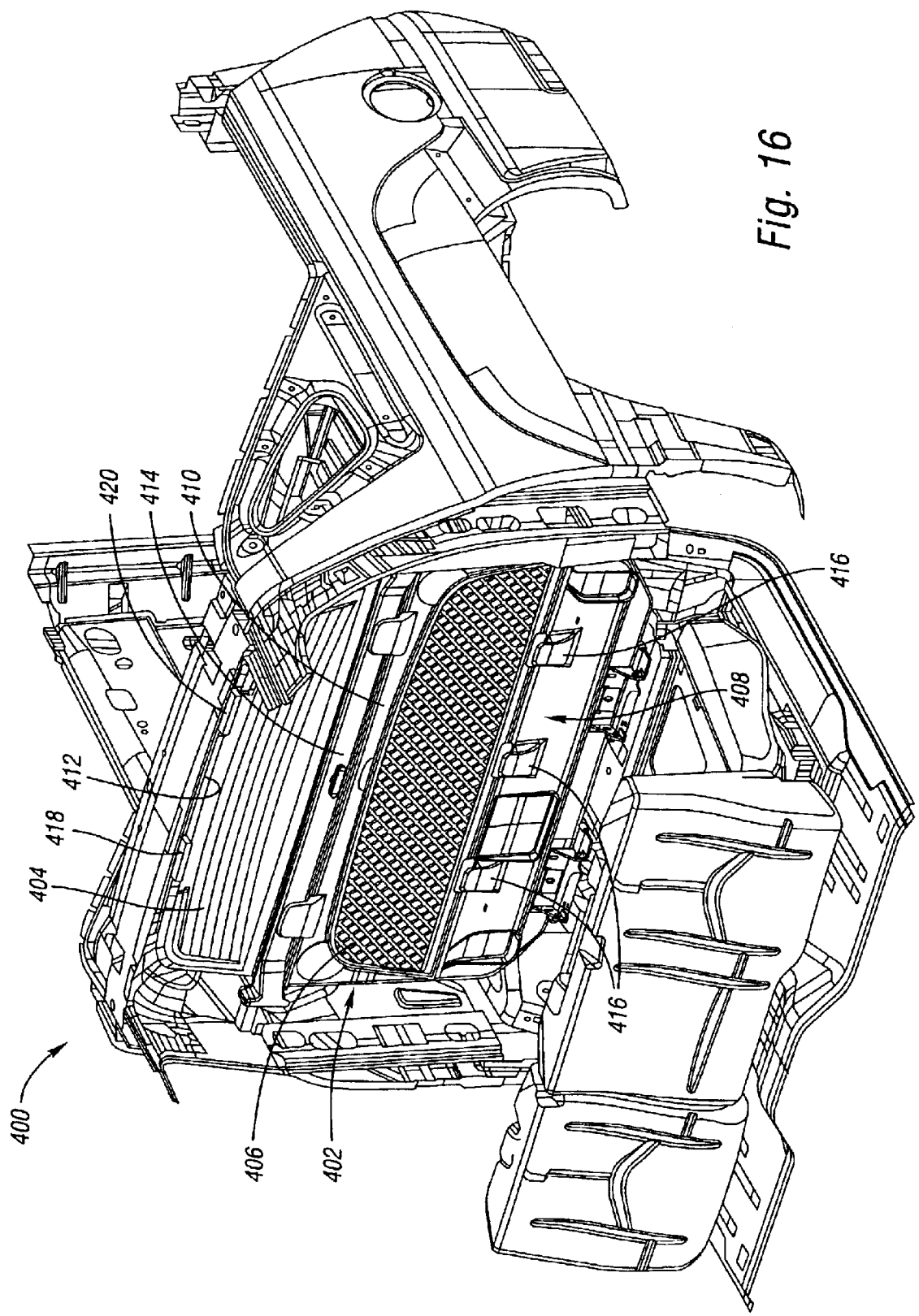

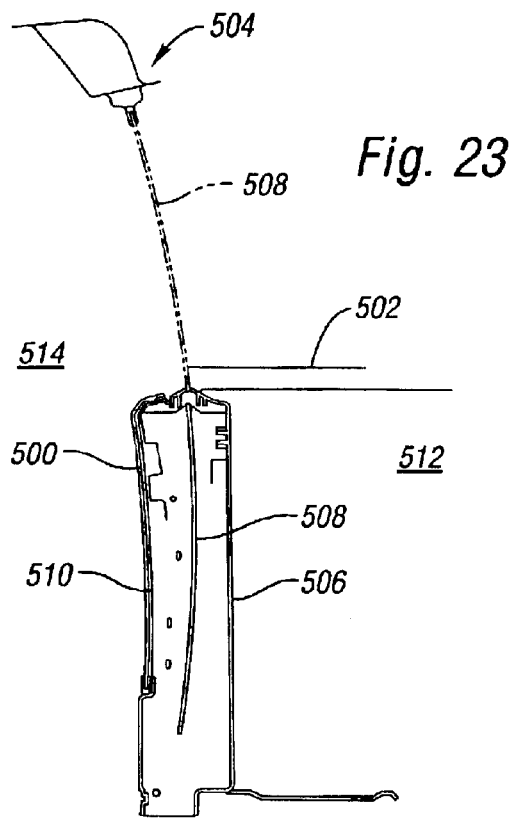
Fig. 23
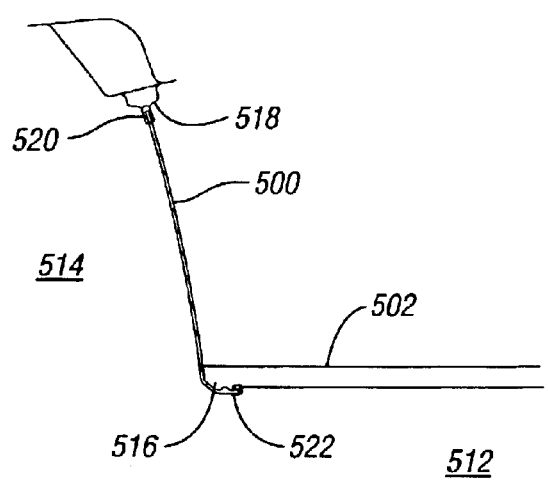
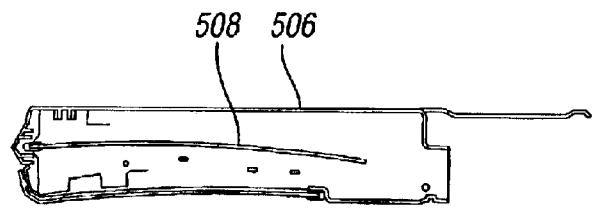
Fig. 24

VEHICLE BODY WITH PRE-HUNG MIDGATE PANEL

TECHNICAL FIELD

The present invention relates to a vehicle body having a midgate panel which is pre-hung on a structural ring for installation in a body opening between a passenger compartment and a cargo compartment.

BACKGROUND OF THE INVENTION

It is known in the art to provide a pickup truck or SUV having a cab portion for carrying passengers with a rear seat section behind the driver and a cargo box behind the cab portion for carrying cargo. It is also known to provide aligned openings in the cab portion and the cargo box for carrying longer loads which extend into the passenger compartment when the rear seat is folded down. Currently, a multi-use vehicle is available which provides a pickup truck or SUV having a rear passenger compartment convertible to a cargo area and separated from a rear pickup box by a midgate having a flexible hinged panel and window system. This vehicle is adapted to accommodate a variety of optional configurations for alternatively carrying a maximum passenger load or an extended cargo load under both covered and uncovered conditions in which the cargo load is protected from or exposed to ambient external conditions.

An issue with current midgate panel designs may be installation and alignment. The body opening between the cab portion and cargo box is formed by numerous body components. Accordingly, build variations in these body components may cause variations in the actual size of the opening between the cab portion and cargo box, which can significantly affect the fit between the midgate panel and the opening, which may affect sealing, opening and closing efforts of the midgate panel.

SUMMARY OF THE INVENTION

The invention provides a structural ring to which the midgate panel is pre-hung prior to installation of the ring and panel in the opening between adjacent body compartments. By pre-hanging the midgate panel onto the ring, the fit and operating effort for the midgate panel with respect to the ring may be precisely controlled independently of build variations in the body opening. The structural ring may also include a cross-bar and window preassembled therein for installation with the ring into the body opening.

More specifically, the invention provides a vehicle body having a first compartment for carrying passengers or cargo and a second compartment for carrying cargo rearwardly adjacent to the first compartment. The body includes a plurality of body components defining an opening between the first and second compartments. A structural ring is attached in the opening and includes a midgate panel preassembled to the support ring to ease installation. At least one hinge pivotally connects the midgate panel to the support ring, and at least one latch selectively secures the midgate panel in an upright, closed position.

A method of installing a midgate panel in an opening between adjacent compartments in a vehicle is also provided, and includes the following steps:

a. assembling the midgate panel to a structural ring such that the midgate panel is hinged to the ring for movement between open and closed positions; and b. thereafter installing the ring and attached midgate panel in the opening between adjacent compartments.

Preferably the support ring is a one piece steel ring which is welded or bolted to the body components in the opening.

The midgate panel may be connected inside a lower portion of the ring, and a window may be connected inside an upper portion of the ring. A window latch is operative to hold the window closed in the ring. Further, a cross-bar may extend across the ring between the midgate panel and the window. Alternatively, a window may be connected in the opening above the support ring.

A pass-through aperture may also be formed in the midgate panel, and a ramp member may be pivotable between a closed position covering the pass-through aperture and an open position contacting a body floor and forming a ramp to facilitate sliding long cargo through the pass-through aperture. The ramp member preferably has a hinge end pivotably connected to the midgate panel and an opposite end which contacts the floor in the open position. A second ramp member may be connected to an opposite side of the midgate for selectively covering an opposite end of the pass-through aperture.

Alternatively, a slideable pass-through closure may be slideably positioned over a pass-through opening formed in the midgate panel.

A window may be lowerable into the midgate panel for access through a window opening and raiseable for closing the window opening while allowing viewing therethrough. A pass-through opening may also be formed in the midgate panel, and first and second slideable pass-through closures may be slideably positioned over the pass-through opening for selectively opening and closing the opening.

An electric motor may be provided to pivot the midgate panel between open and closed positions.

Further, a counter-balancing strut may be operatively connected between the midgate panel and a body floor to bias the midgate panel toward open and closed positions, respectively, depending upon the pivoted position of the midgate panel.

A cross-bar may be connected above the midgate panel, and a removable window may be attachable in a window opening above the cross-bar. A screen may be attachable in the window opening when the window is removed, and the midgate panel may form a pocket to receive the screen or window when not positioned in the window.

Further, a window may be pivotably connected to the midgate panel for movement between a open position and a closed position covering an upper portion of the opening. The midgate panel may have a recess to receive the window in the open position, and the midgate panel and glass may be collapsible together against a body floor. The window may be powered or manually raised and lowered within the midgate to be fully closed, opened or positioned in an intermediate position.

A window may be hinged along an upper edge of the opening for selectively covering a window opening above the midgate panel.

A control may be provided for allowing the window to be raised or lowered only if the midgate panel is closed or only if a pass-through closure is closed.

Alternatively, a control may be provided for allowing unlatching of the midgate panel latch or allowing the window to be raised or lowered only when a corresponding vehicle transmission is in a park or neutral condition.

Further, a sealing panel may be removably connected to the midgate panel for selective connection to a hard cargo cover which is connected to the body to cover the second compartment (pickup truck bed). The sealing panel is attachable to a forward edge of the cargo cover over the window opening to seal the window opening to prevent water entry when the window and midgate panel are folded down.

These and other features and advantages of the invention will be more fully understood from the following description of specific embodiments of the invention taken together with the accompanying drawings.

BRIEF DESCRIPTION OF THE DRAWINGS

FIGS. 7a and b show schematic vertical cross sectional views of a midgate assembly having a ramp member positioned in closed and open positions with respect to a pass-through aperture in a midgate panel;

FIGS. 8a and b show schematic vertical cross sectional views of a midgate assembly having first and second ramp members in closed and open positions, respectively, with respect to a pass-through aperture in a midgate panel;

FIG. 9 shows a rear perspective view of a vehicle body having a midgate panel with a pass-through aperture and a ramp member in an open position;

FIG. 13b shows a vertical cross sectional view of the assembly of FIG. 13a;

FIG. 14b shows an enlarged schematic view illustrating drive and driven gears and a motor of FIG. 14a;

FIG. 16 shows a perspective view of a vehicle body having a midgate panel supporting a screen which is interchangeable with a window positioned above the midgate panel;

FIG. 18b shows a vertical cross sectional view of the midgate panel and window of FIG. 18a;

FIG. 23 shows a vertical cross sectional view of a midgate panel, glass, and sealing panel in an upright position on a vehicle; and FIG. 24 shows a cross sectional view of the midgate panel, glass and sealing panel of FIG. 23 with the midgate panel and glass collapsed and the sealing panel connected in a window opening.

DESCRIPTION OF THE PREFERRED EMBODIMENTS

Figure 1:
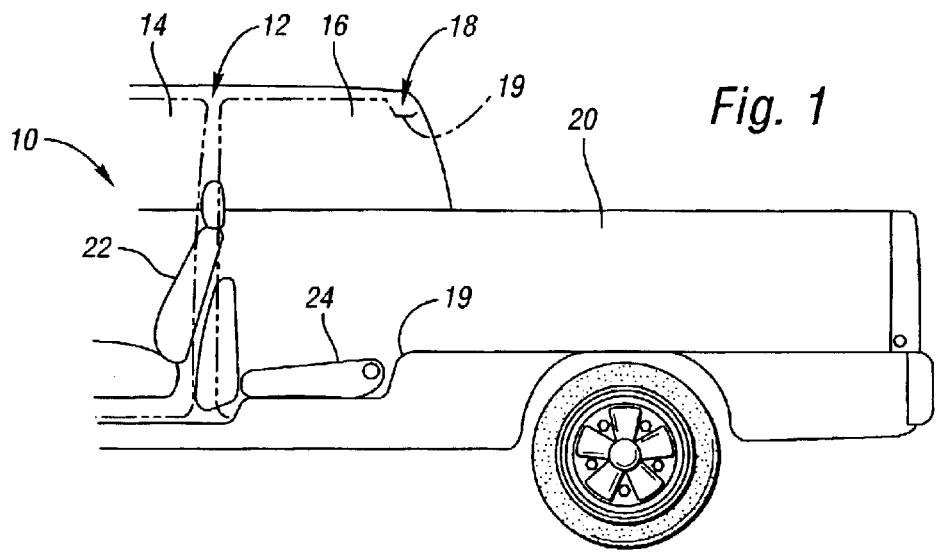
FIG. 1 shows a schematic partial side view of a vehicle having an opening for receiving a midgate in accordance with invention.

Referring to FIG. 1, numeral 10 generally indicates a pickup truck of the extended cab type having a body 12 including an internal front compartment 14 connected with an internal rear compartment 16 which is to be separated from an external rear compartment or cargo box 20 by a midgate panel and window to be described below. The midgate panel is positioned within the opening 19 between the compartment 16 and cargo box 20. The midgate panel may be steel, aluminum, polymer, magnesium or composite. The panel could be a single component, bent together with endcaps to hold it in a desired shape, or it could have a structural inner member with composite inner and outer panels. The panels could include glass, talc, or other fillers for strength. As shown, seats 22, 24 are positioned in the front and rear compartments 14, 16, respectively. The seat 24 is collapsible as shown.

Figure 2:
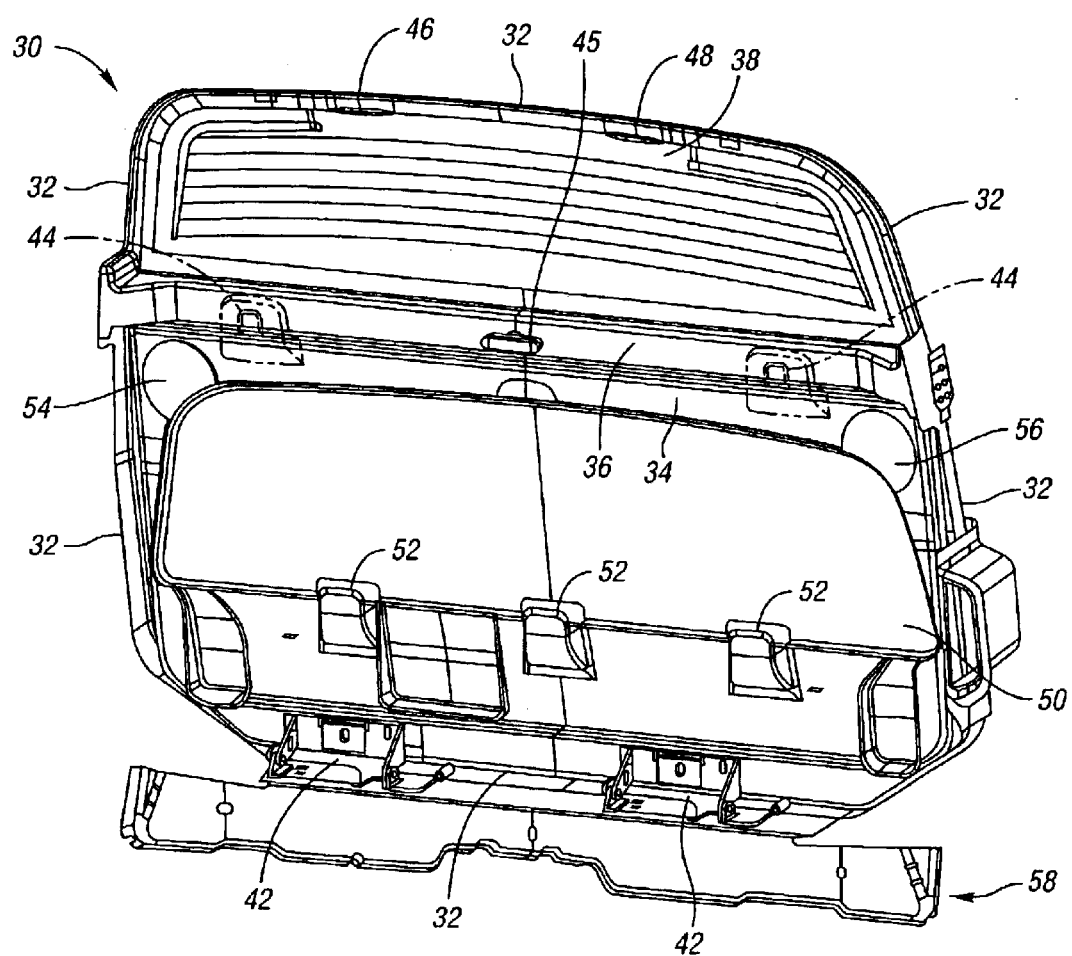
FIG. 2 shows a perspective view of a structural ring, midgate panel and window in accordance with the invention.

Turning to FIG. 2, a midgate assembly 30 is shown for installation into the opening 19 in the truck 10 of FIG. 1. A midgate assembly 30 includes a structural ring 32 which is preferably a one piece steel component which is to be welded into position within the opening 19 of FIG. 1. Of course, the structural ring need not be a one-piece component. The ring may be an assembly, and it may include blow-molded composite, stamped metal, roll-formed metal, injection molded plastic, steel, aluminum, steel-reinforced composite, or other components or materials. The one-piece or multi-piece ring would enter an assembly plant as a single component or a single assembly. The ring may be welded and/or bolted into place.

Prior to installing the ring 32 into the opening 19 in the vehicle 10 in FIG. 1, the midgate panel 34, cross-bar 36 and window 38 are pre-assembled into the ring 32. Accordingly, the midgate panel 34 is "pre-hung" into the ring 32 and pivotably connected with respect to the ring 32 by the hinges 42. Therefore, the opening and closing effort and sealing performance of the midgate panel 34 with respect to the ring 32 may be properly tuned and tested prior to installation of the midgate assembly 30 in the opening 19 of the vehicle 10 of FIG. 1 so that vehicle build variations do not affect the performance of the midgate panel.

The midgate panel 34 also includes a striker which is engagable with a latch 44 on each side, shown in phantom, for selectively securing the midgate panel 34 in an upright position attached to the cross-bar 36, and therefore to the ring 32. The latches 44 are disengageable via the handle 45 for reconfiguring (i.e. pivoting) the midgate panel 34.

Window latches 46, 48 are also provided along the ring 32 at the upper edge of the window 38 to allow selective attachment and removal of the window 38 from the corresponding window opening. A pocket 50 is provided on the midgate panel 34 to receive the window 38, and includes lower supports 52 to support the lower edge of the window and dials 54, 56 which rotate to secure the window in the pocket 50. As shown, the dials 54,56 are circular with a cutout portion. When the cutout portion faces the pocket, a window may be moved into or out of the pocket. When the dial is rotated with the window in the pocket the cutout portion moves away from the window and the circular portion of the dial locks the window in the pocket. FIG. 2 also shows a water management member 58 which is secured to a lower edge of the ring 32 for managing the flow of water which may be present adjacent to the midgate assembly 30.

Figure 3:
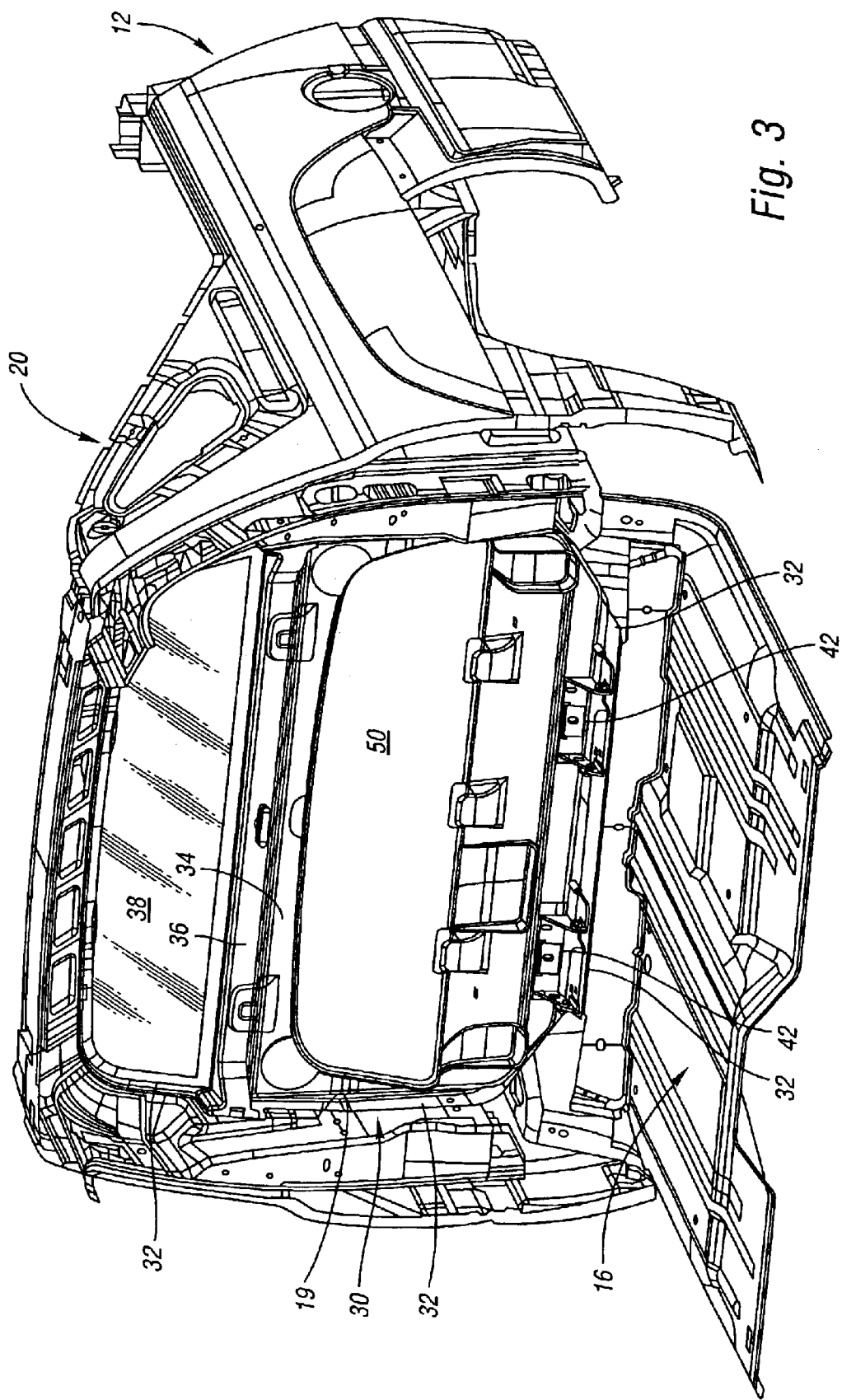
FIG. 3 shows a perspective view of a disassembled vehicle body having the structural ring, midgate panel and window of FIG. 2 installed therein.

Referring to FIG. 3, the midgate assembly 30 of FIG. 2 is shown installed within the opening 19 of the pickup truck body 12 between the compartment 16 and the cargo box 20. The midgate panel 34 is pivotable about the hinges 42 between the upright, closed position as shown in FIG. 3 and a folded position in which the midgate panel 34 extends into the compartment 16 of the body 12. The cross-bar 36 may stay in position connected to the ring 32 when the midgate panel 34 is pivoted down, or the cross-bar 36 may pivot down with the midgate panel 34 if the glass 38 has been removed from the window opening above the cross-bar 36.

Figure 4:
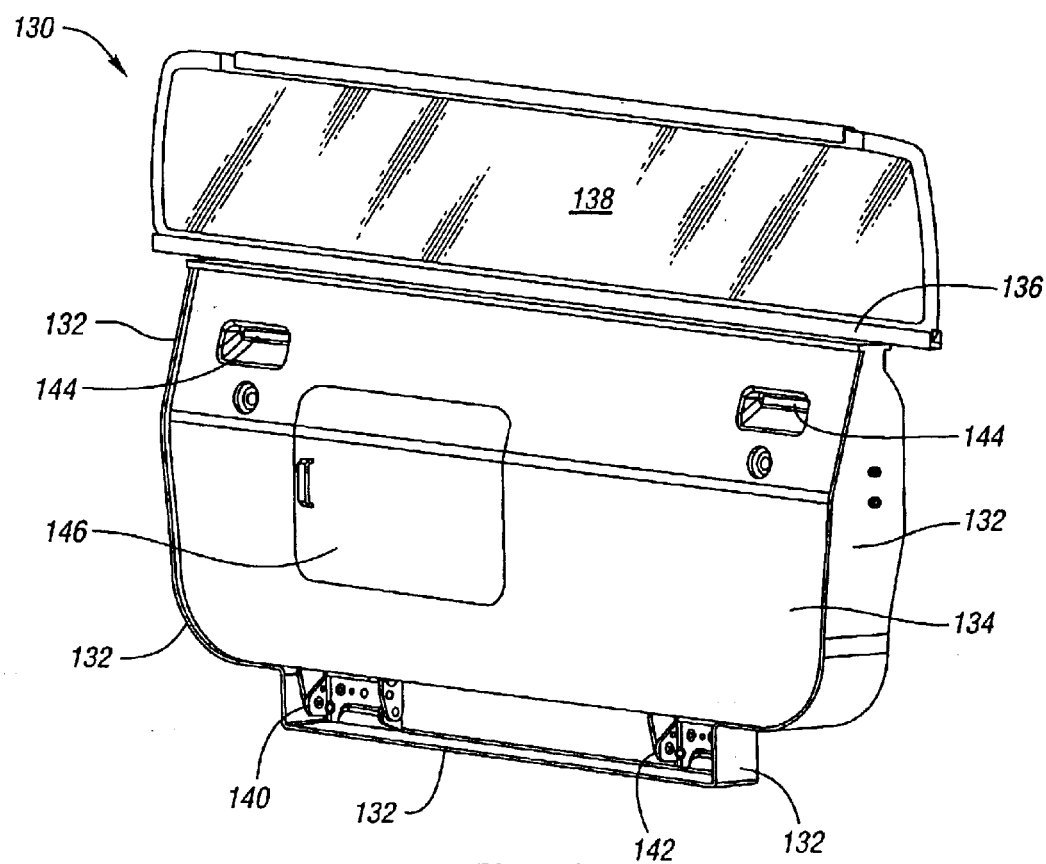
FIG. 4 shows a perspective view of a structural ring, midgate panel and fixed window in accordance with an alternative embodiment of the invention.

Turning to FIG. 4, an alternative midgate assembly 130 is shown. The midgate assembly 130 includes a structural ring 132 which supports the pre-hung midgate panel 134. The midgate panel 134 is pivotably connected to the ring 132 by the hinges 140, 142, so that the midgate panel 134 is pivotable between a closed position as shown in FIG. 4, and an open position in which the midgate panel 134 is pivoted with respect to the ring 132 above the hinges 140, 142 to form a midgate opening.

Handles 144 are also provided, and internal striker/latches (not shown) selectively disconnect the midgate panel 134 from the ring 132 to allow pivoting movement of the midgate panel 134 with respect to the ring 132. A pass-through closure panel 146 is also shown for selectively covering a pass-through opening in the midgate panel 134.

Accordingly, the midgate panel 134 is "pre-hung" to the ring 132 prior to installation of the ring 132 in a vehicle body so that the midgate panel 134 may be accurately fit (i.e., perfectly adjusted) within the ring 132, and opening/closing effort of the midgate panel 134 with respect to the ring 132 may be tuned. In this manner, build variations of the vehicle body do not affect the installation of the midgate panel 134 or the sealing or opening/closing efforts of the midgate panel 134. In other words, the midgate panel is "perfectly adjusted" within the ring prior to installation in the vehicle to optimize fit, effort, function and sealing.

The midgate assembly 130 also includes a fixed cross-bar 136 which supports the fixed window 138.

Figure 5:
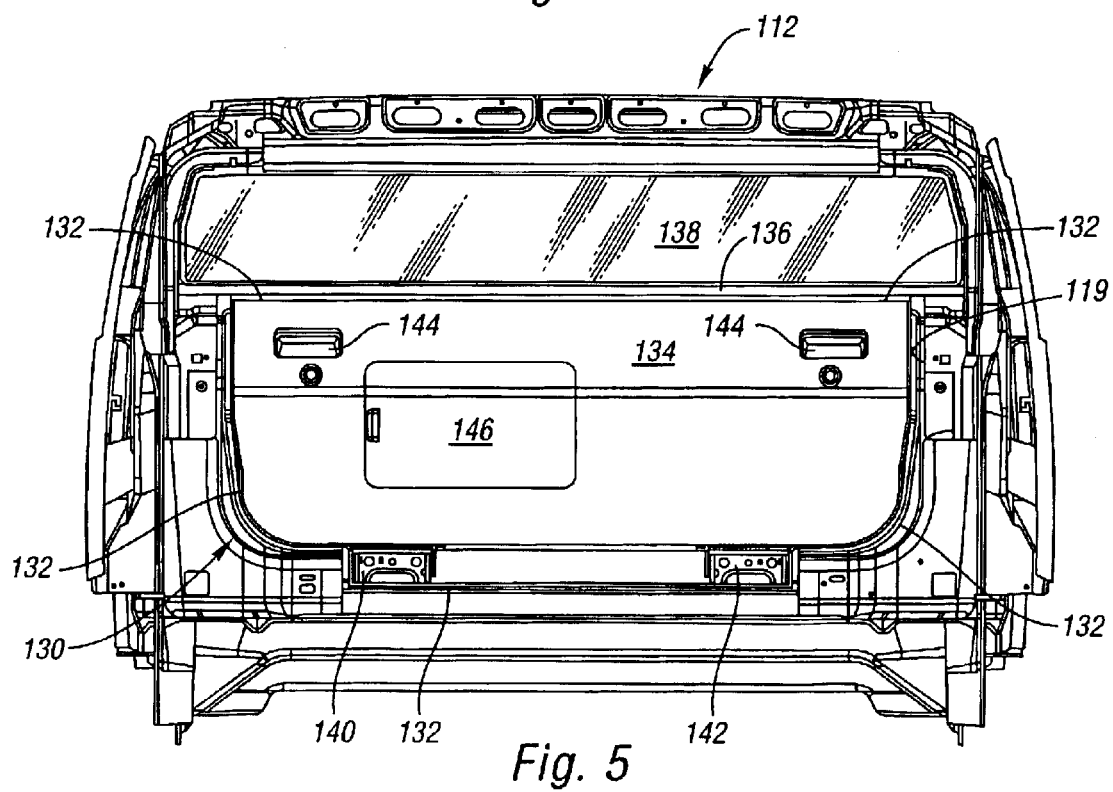
FIG. 5 shows a rear view of the structural ring, midgate panel and window of FIG. 4 installed in a vehicle.

FIG. 5 shows the midgate assembly 130 of FIG. 4 installed into the opening 119 in a vehicle body 112.

Figure 6:
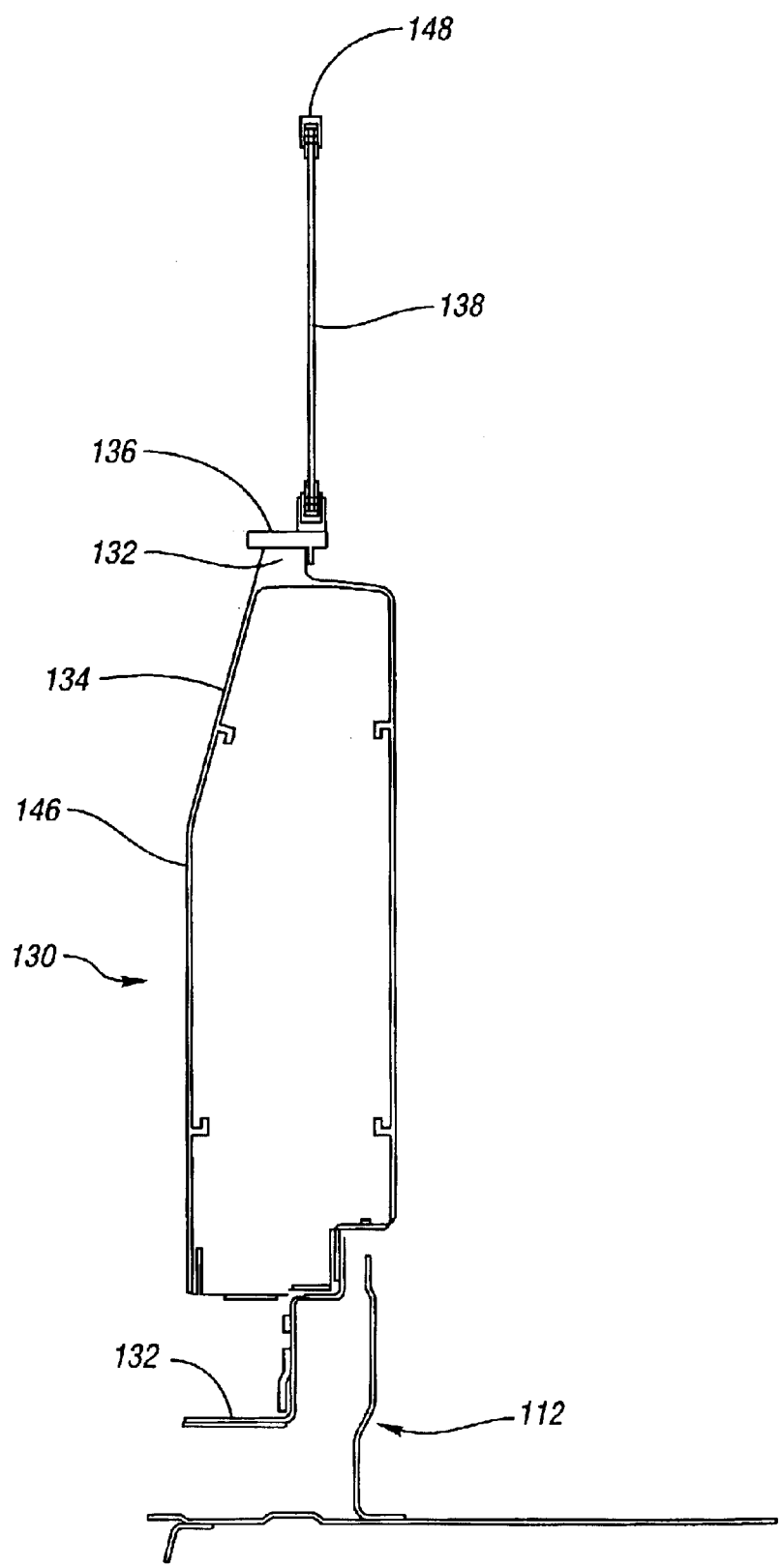
FIG. 6 shows a cross sectional view of the assembly of FIG. 5.

FIG. 6 shows a vertical cross sectional view of the midgate assembly 130 in the vehicle body 112 of FIG. 5. As shown, the window 138 is adhered along an upper edge to a fixed upper support bar 148.

The pre-hung midgate panel assemblies described above may include a variety of different features, which will be described below with reference to FIGS. 7a–25.

FIGS. 7a–10 illustrate the use of ramp members implemented into a midgate panel (such as the previously described midgate panels 34, 134). Midgate panels may be provided with pass-through openings to facilitate storage of long cargo items, such as long boards, or the like. Long cargo items are typically slid in from the rear of a pickup truck bed by a person standing near the rear of the pickup truck, and it may be difficult to insert the ends of these long cargo items through the pass-through opening in the midgate panel without entering the pickup truck bed. Accordingly, ramp members are provided which double as closure panels and assist in directing the longer cargo items through the pass-through aperture when the longer cargo items are slid in from the rear end of a pickup truck bed. FIGS. 7a and 7b show schematic vertical cross sectional views of a midgate assembly 210 including a window 212 and midgate panel 214. The midgate panel 214 includes a pass-through aperture 216 which is selectively covered by the ramp member 218. The ramp member 218 is pivotally connected to the midgate panel 214 at the hinge 220, and includes a distal end 224 which contacts a body floor and a ramp surface 222 which guides cargo through the pass-through aperture 216.

FIGS. 8a and 8b show schematic vertical cross sectional views of a midgate assembly 230 which includes a window 232, midgate panel 234, pass-through aperture 236, and two ramp members 238, 240 which are pivotally connected to the midgate panel 234 at the hinges 242, 244, respectively, to selectively cover the pass-through aperture 236. The ramp members 238, 240 include ramp surfaces 246, 248 to guide longer cargo items through the pass-through aperture 236.

Figure 10:
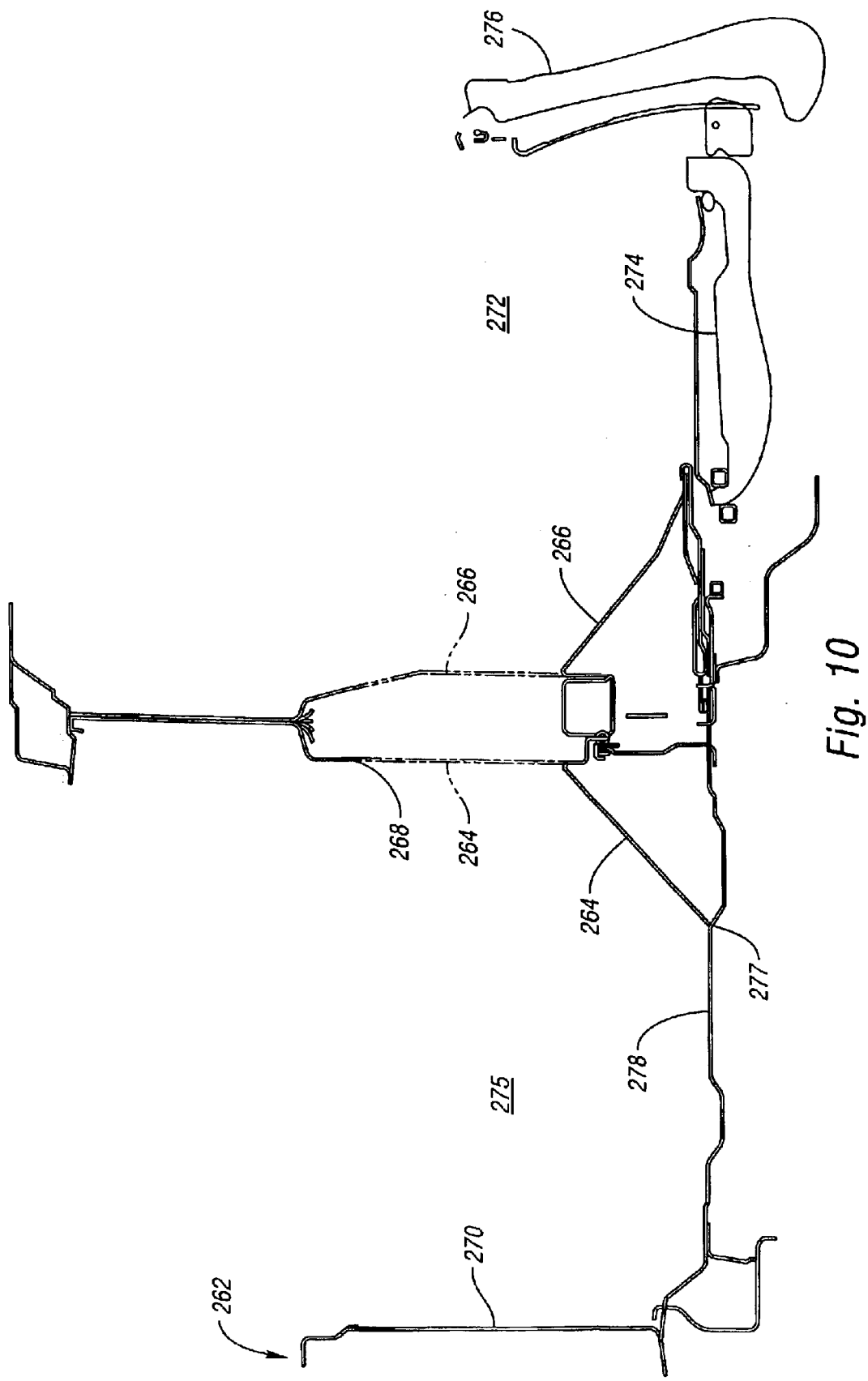
FIG. 10 shows a longitudinal cross sectional view of the body assembly of FIG. 9 with the ramp members in the open position, with the closed position in phantom.

FIGS. 9 and 10 show a particular embodiment of a midgate panel 260 on a vehicle body 262 which incorporates ramp members 264, 266 for selectively covering a pass-through aperture 268 in the midgate panel 260. The ramp members 264, 266 are pivotable between the closed position shown in phantom in FIG. 10 to cover the pass-through opening and the open position shown in solid lines in FIG. 10 to expose the pass-through aperture 268 and allow use of the ramp members 264, 266 to guide cargo through the pass-through aperture 268 when the cargo is slid from the rear end 270 of the body 262 onto the ramp member 264, or from the passenger compartment 272 across the ramp member 266 through the aperture 268. The ramp members 264, 266 are preferably a composite or metal material. FIGS. 9 and 10 also show the reconfigured seat members 274, 276 which increase storage capacity in the passenger compartment 272 to allow the longer cargo items to extend from the rear cargo area 275 into the passenger compartment 272.

As shown in FIG. 10, the distal end 277 of the ramp member 264 contacts the body floor 278 when in the open position.

Figure 11A:
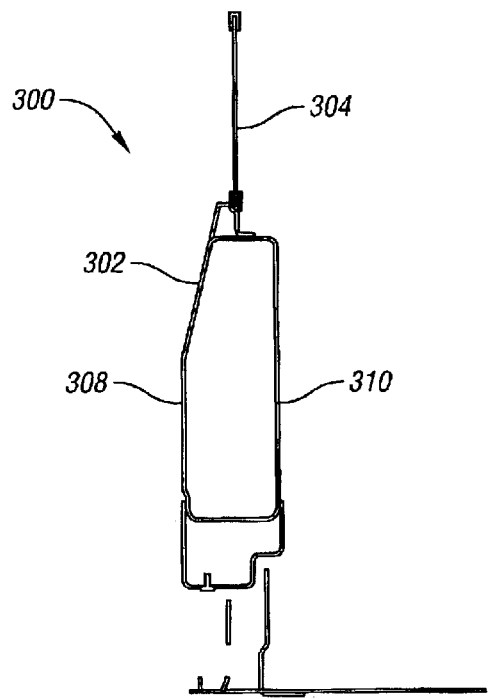
FIG. 11a shows a vertical cross sectional view of a midgate panel having a pass-through opening covered by first and second slideable closures.
Figure 11B:
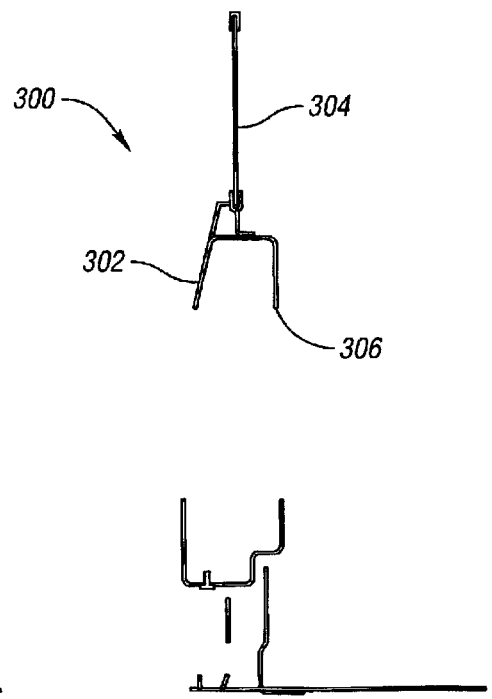
FIG. 11b shows a vertical cross sectional view of the midgate panel of FIG. 11a with the slideable closures slid to an open position, and therefore not shown in the cross section.
Figure 12:
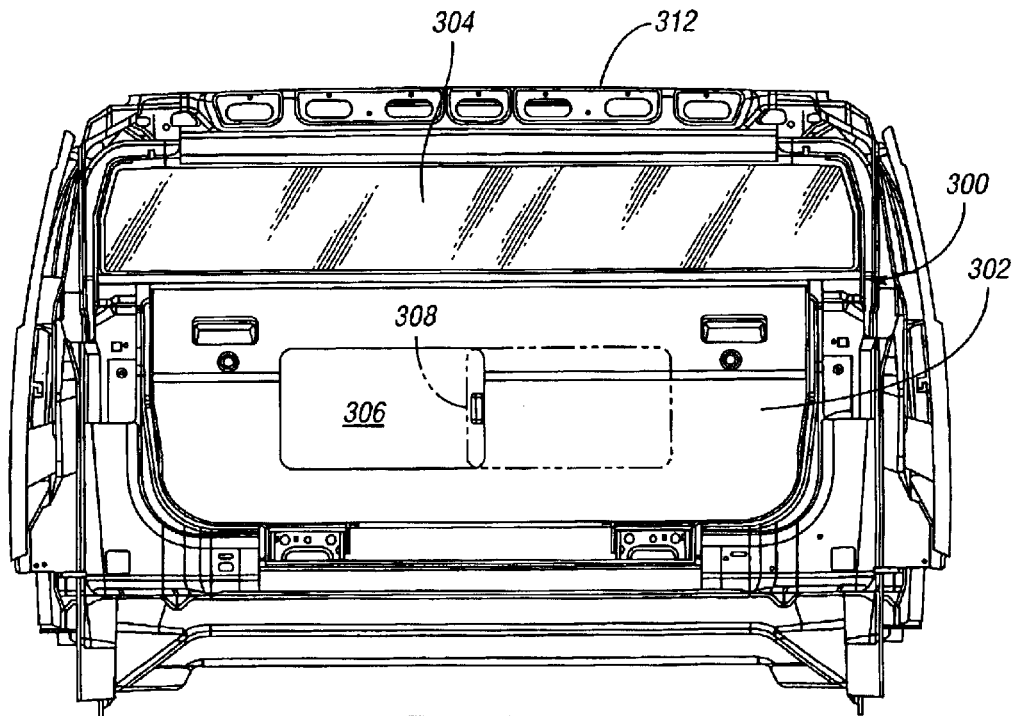
FIG. 12 shows a rear view of the midgate panel and slideable pass-through closure of FIG. 11a with the slideable closure in the open position.

FIGS. 11a, 11b and 12 show a midgate assembly 300 having a midgate panel 302 positioned below a window 304 and including a pass-through aperture 306 which is selectively exposed by slideable pass-through closures 308, 310 which are slideably connected to the midgate panel 302 for movement between the closed position shown in FIG. 11a and the open position shown in FIGS. 11b and 12. FIG. 12 also shows the body 312 which forms the opening within which the midgate assembly 300 is installed. These pass-through closures may be provided on previously described midgate panels 34, 134.

Figure 13A:
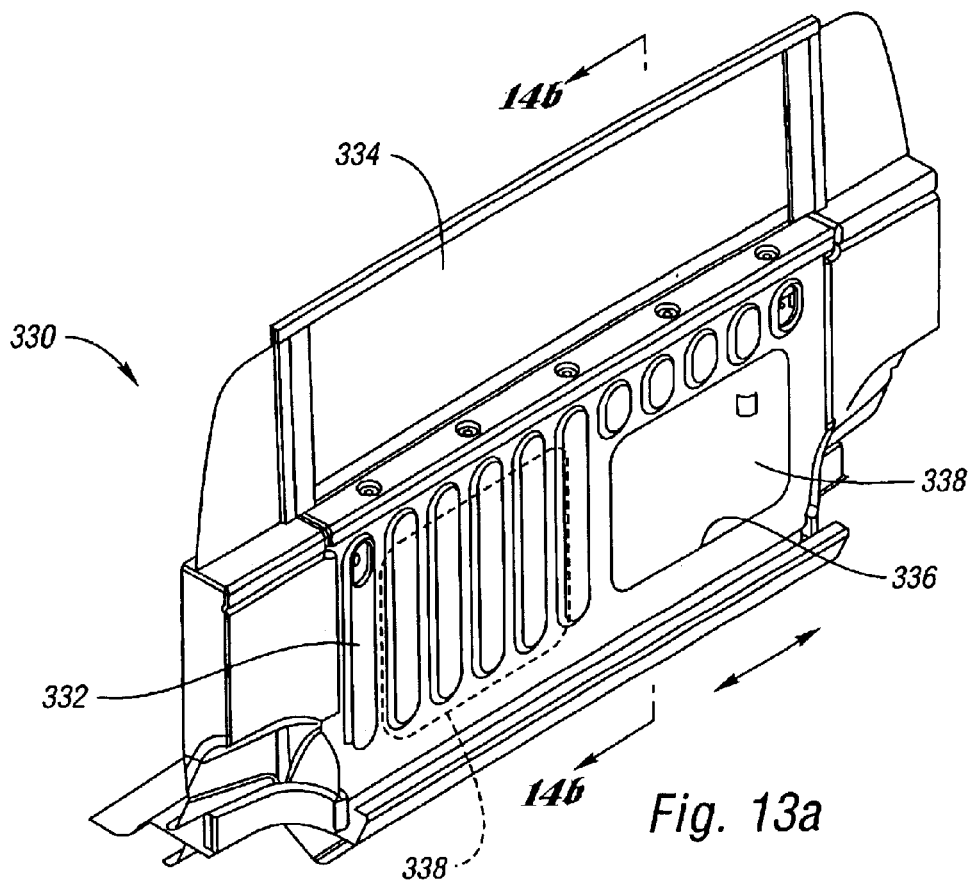
FIG. 13a shows a perspective view of a midgate panel having a lowerable window with a slideable pass-through closure positioned over a pass-through aperture.
Figure 13B:
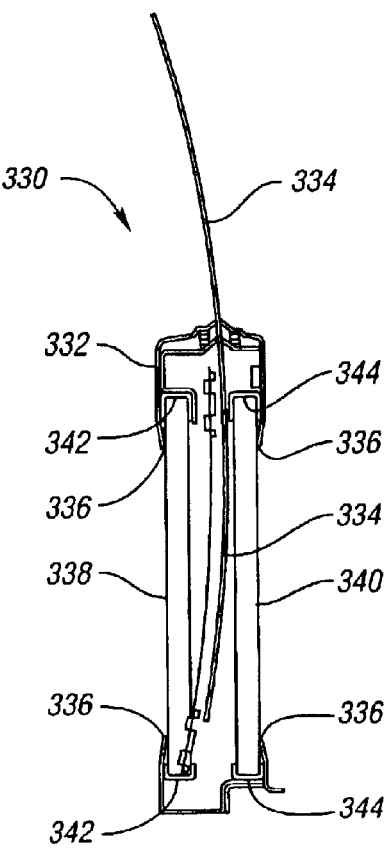

FIGS. 13a and 13b show a midgate assembly 330 including a midgate panel 332 reinforces or guides a window 334 which is lowerable into the midgate panel 332 for providing access through a window opening, and is raiseable for closing the window opening while allowing viewing through the window 334. A pass-through opening 336 is formed through the midgate panel 332 and includes first and second slideable pass-through closures 338, 340 which are slideable along tracks 342, 344, respectively, between the closed position shown in FIG. 13a, and the open position shown in phantom in FIG. 13a for opening and closing the pass-through aperture 336.

Figure 14A:
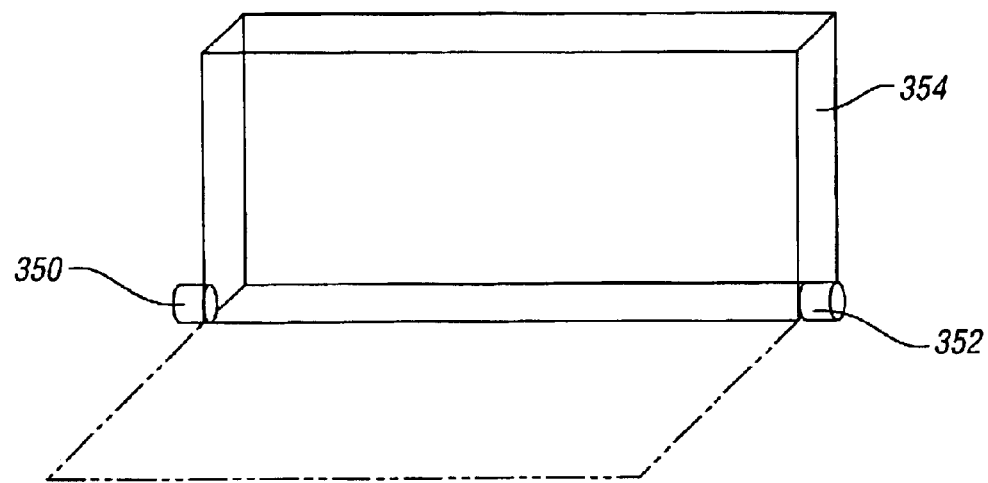
FIG. 14a shows a schematic perspective view of a midgate panel including a drive motor for pivoting the panel.
Figure 14B:
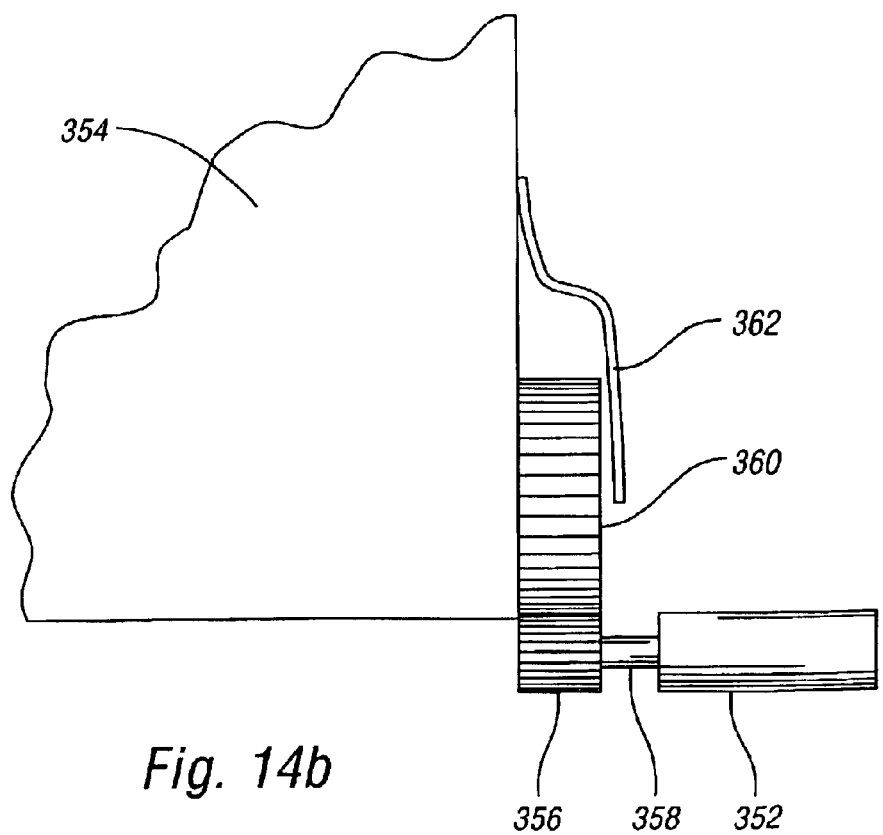

FIGS. 14a and 14b schematically illustrate the use of drive motors 350, 352 which are operative to pivot the midgate panel 354 between open and closed positions. As shown, the motor 352 rotates a drive gear 356 through a shaft 358, and the rotation of the drive gear 356 actuates pivotal movement of the midgate panel 354 by engagement of the teeth of the drive gear 356 with the teeth of the driven gear 360. A trim piece 362 is provided to cover the driven gear 360. Of course, this configuration may be replaced with a curved rack and pinion, a cable/pulley drive system, a drive motor in the middle of the midgate panel, etc. The system may be equipped with a clutch. Further, a single motor may be used as a regulator, latching motor, midgate drive motor, etc. Remote keyless entry may be implemented to signal pivotal movement of the midgate panel. The drive motors may be implemented on the previously described midgate panels 34, 134.

Figure 15A:
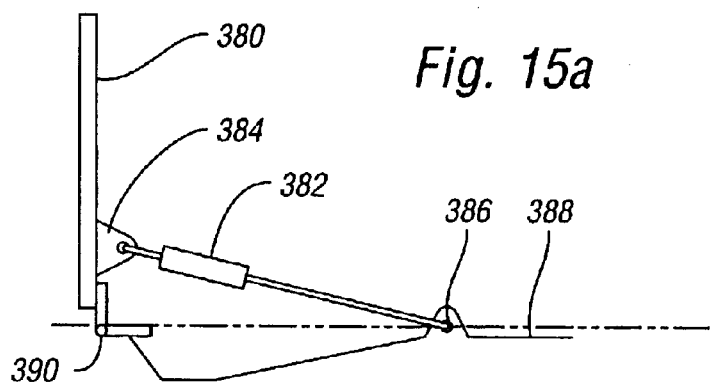
FIGS. 15a–d show sequential side schematic illustrations of a midgate panel and counterbalance strut in various positions between upright (15a) and collapsed (15d) positions.
Figure 15B:
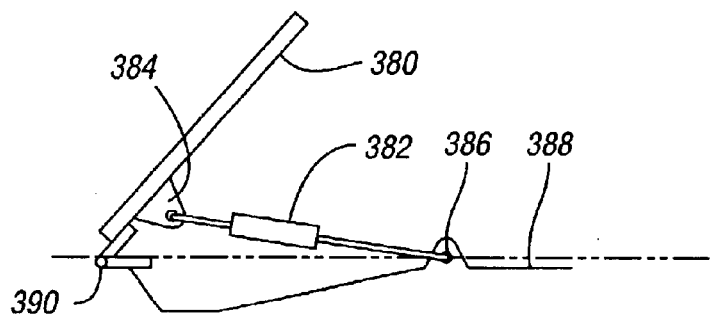
Figure 15C:
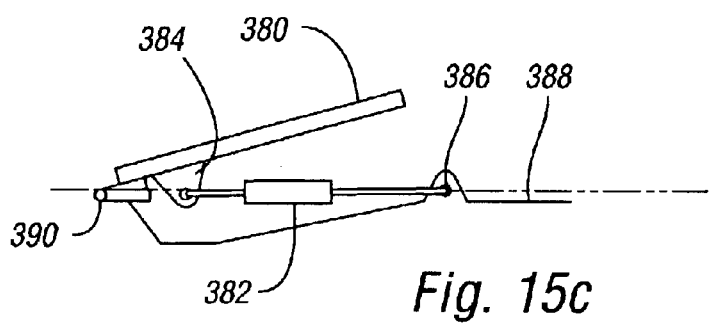
Figure 15D:
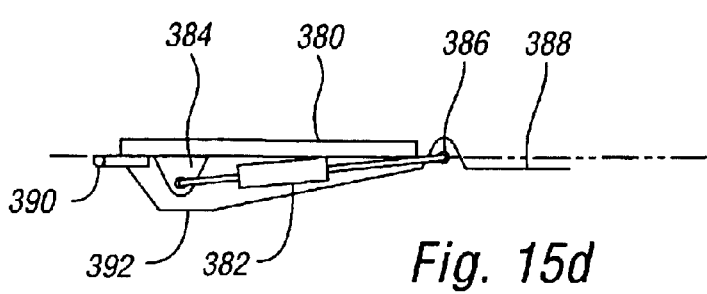

FIGS. 15a–d show sequential positions of a midgate panel 380 pivoting between an upright position shown in FIG. 15a and a collapsed position in FIG. 15d. As illustrated, a counterbalance gas strut 382 is operatively connected between a support bracket 384 on the midgate panel 380 and a floor bracket 386 extending from the body floor 388. As shown, the midgate panel 380 is pivotally connected to the body floor 388 at a pivot joint 390.

In the upright position shown in FIG. 15a, the gas strut 382 is exerting a force on the midgate panel 380 and the bracket 386. The gas strut 382 is always attempting to expand, and therefore holds the midgate panel 380 in the upright position. In FIG. 15b, a user is exerting a force against the midgate panel 380 to pivot the midgate in a closing direction about the pivot joint 390. The gas strut 382 is still exerting a force on the midgate panel 380 and floor bracket 386. The force the user is exerting on the midgate panel is overcoming the gas strut, causing it to compress. The gas strut is moving closer to the floor as the midgate panel 380 is closing. At the point shown in FIG. 15c, the gas strut 382 begins to go over-center. The gas strut 382 does not compress any more than in this position. When the midgate panel is pushed down even further, the gas strut 382 begins to expand and causes the midgate panel to be pulled downward toward the floor 388. In FIG. 15d, the gas strut 382 has pulled the midgate panel 380 into the folded down position. The user force was not needed to pull the midgate panel down to its final position. The gas strut 382 serves as a damping device to prevent the midgate panel 380 from popping up when the vehicle goes over bumps and swells. As shown, the recess 392 in the body floor 388 allows the gas strut 382 and bracket 384 to extend below the plane of the body floor 388 for compact storage after the gas strut has gone over-center. The gas strut 382 may be replaced by a compression spring or the like. The gas strut 382 may be implemented on the previously described midgate panels 34, 134. The gas strut includes a pressurized cylinder which acts to extend a piston. The performance criteria of the gas strut would depend upon the mass of the midgate panel, and must provide a sufficient assist force for closing and a sufficient holding force to prevent bouncing of the midgate in the open position. The gas strut 382 also aids in closing the panel 380.

Figure 17:
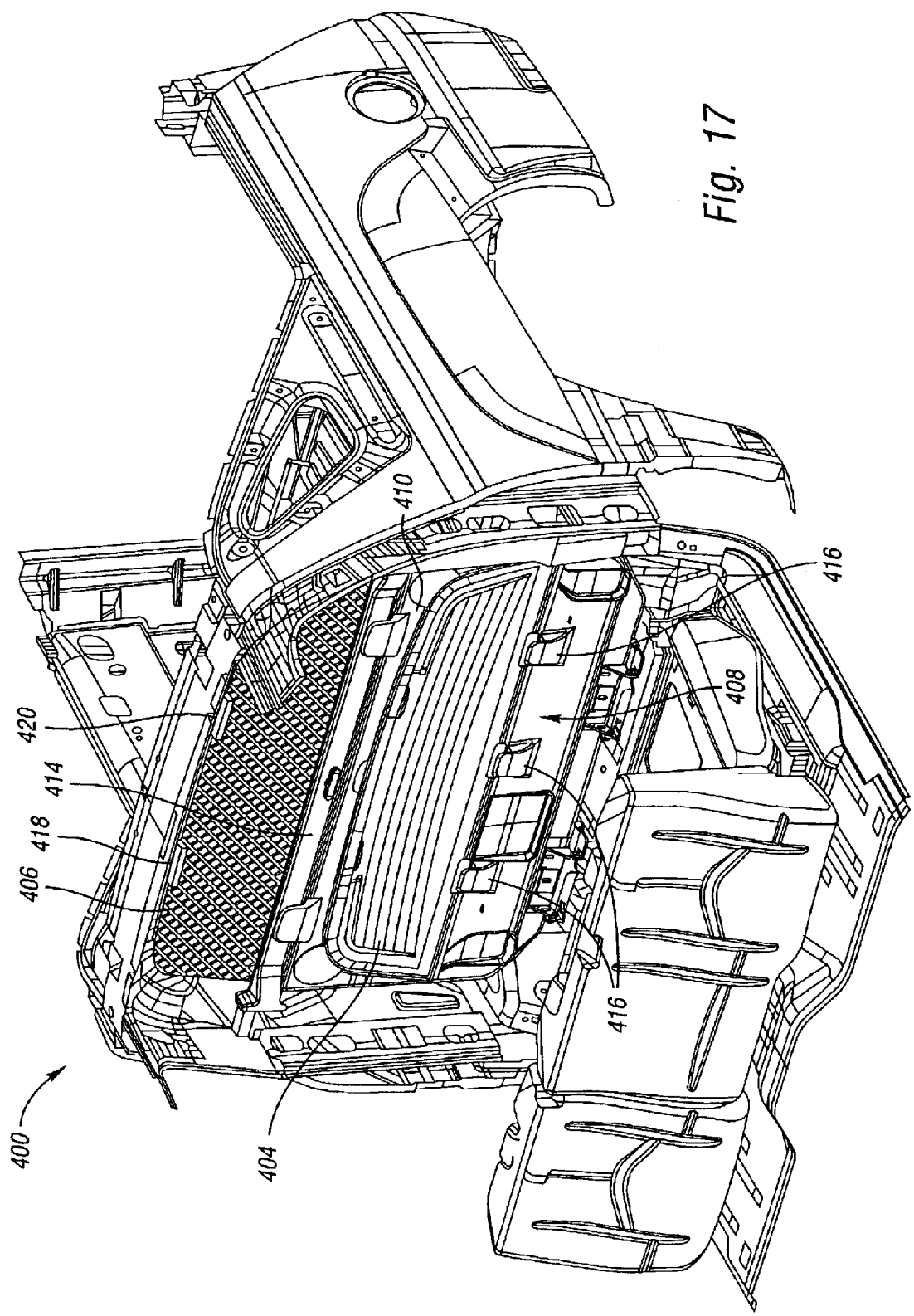
FIG. 17 shows a perspective view of the assembly of FIG. 16 with the screen and window swapped.

FIGS. 16 and 17 illustrate a body 400 having a midgate assembly 402 positioned therein. The midgate assembly 402 includes a window 404 and screen 406 which are interchangeably positionable between the pocket 408 on the midgate panel 410 and the window opening 412 above the cross-bar 414. Supports 416 are provided for holding the screen 406 or window 404 in the pocket 408. Dials (clamping mechanisms) are provided to secure the upper edge of the screen 406 or window 404 in the pocket 408. Releaseable clamps 418, 420 are also provided for securing the upper edge of the window 404 or screen 406 within the window opening 412 while the lower edge of the window 404 or screen 406 is supported by the cross-bar 414.

FIG. 17 shows the body 400 of FIG. 16 with the window 404 and screen 406 having swapped positions. In the configuration shown in FIG. 17, the screen 406 occupies the window opening and allows ventilation into the passenger compartment of the vehicle. The cross-bar 410 may be fixed or removable. The midgate panel is pivotable to a folded down position in the passenger compartment when the window 404 or screen 406 is stored in the pocket 408 of the midgate panel 410. The interchangeable window and screen described above may be implemented in the midgate assembly 30 described previously.

Figure 18A:
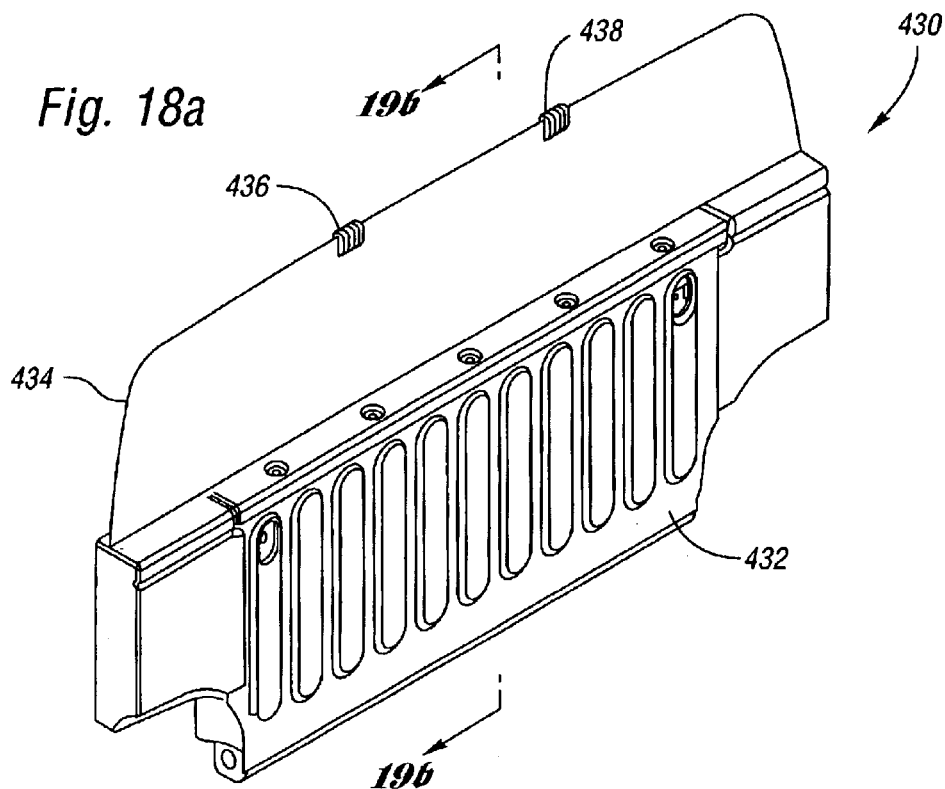
FIG. 18a shows a perspective view of a midgate panel having a hinged window thereabove.
Figure 18B:
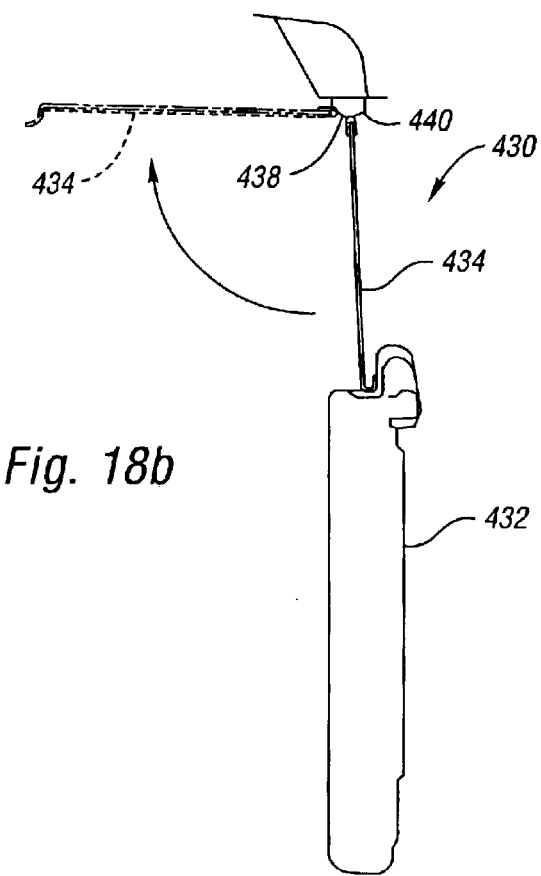

Turning to FIGS. 18a and 18b, a midgate assembly 430 is shown which includes a midgate panel 432 with a pivotable window 434 positioned, above the midgate panel 432. The window 434 includes hinges 436, 438 which are hinged to an upper body component 440 (i.e., the roof) to enable the window 434 to be pivoted upward to the open position shown in phantom in FIG. 18b. In the open position, the window 434 may be stored in a recess in a headliner of the vehicle body. This pivotable window configuration may be implemented in the midgate assembly 30 described previously, and may be pivoted forward or rearward.

Figure 19A:
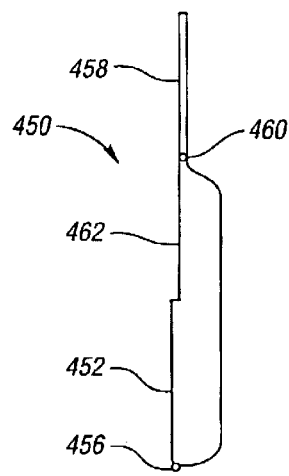
FIG. 19a shows a side view of a window hinged to a midgate panel.
Figure 19B:
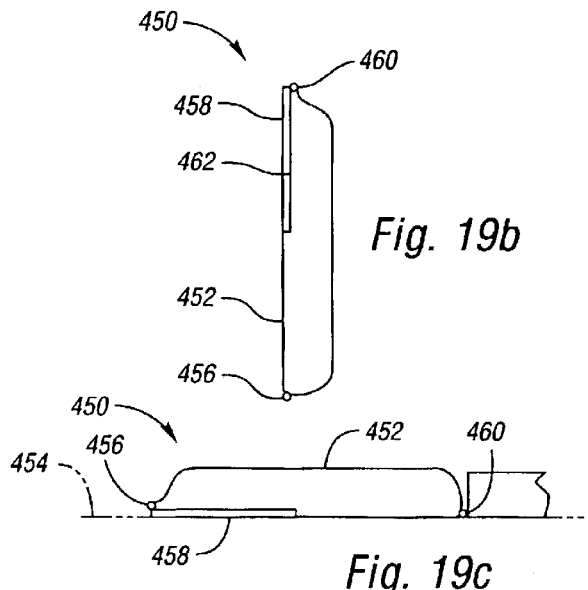
FIG. 19b shows a side view of the midgate panel and window of FIG. 19a with the window pivoted to a folded position.
Figure 19C:
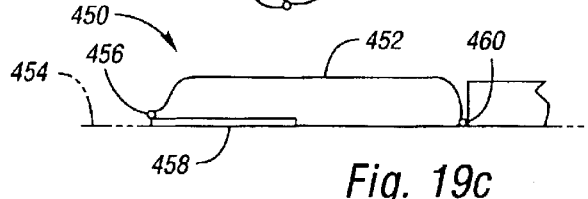
FIG. 19c shows a side view of the midgate panel and window of FIG. 19b folded to a collapsed position against a body floor.

Turning to FIGS. 19a–c, a midgate assembly 450 is shown schematically including a midgate panel 452 which is pivotally connected to a body floor 454 at a pivot joint 456. A window 458 is pivotally connected to the midgate panel 452 at the hinge 460 for pivotal movement into a recess 462 formed in the midgate panel 452. Accordingly, the window 458 may be collapsed from the upright position shown in FIG. 19a into the recess 462 as shown in FIG. 19b, and the midgate panel 452 may then be folded onto the body floor 454 as shown in FIG. 19c.

Figure 20:
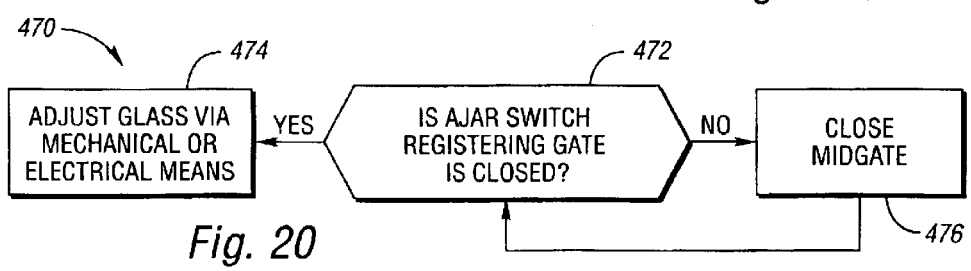
FIG. 20 shows a schematic illustration of a block-out control for controlling window movement based upon the latched condition of the midgate.
Figure 21:
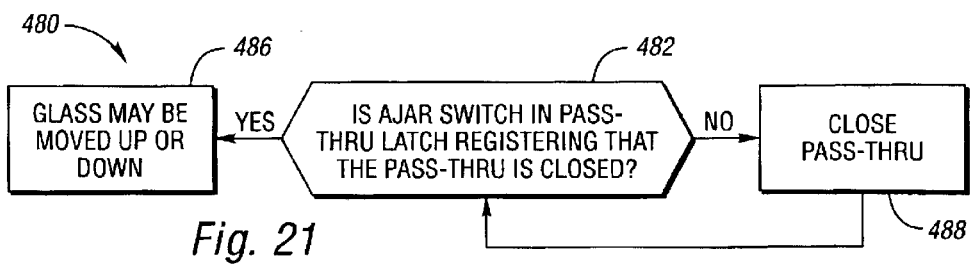
FIG. 21 shows a schematic illustration of a block-out control for controlling window movement based upon the latched condition of a pass-through closure.
Figure 22:
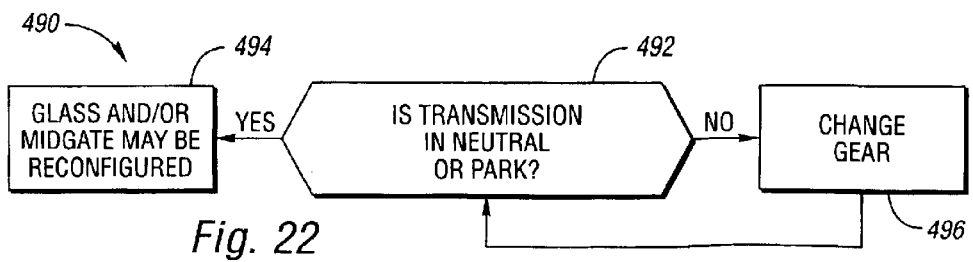
FIG. 22 shows a schematic illustration of a block-out control for controlling movement of a window or midgate based upon the condition of a corresponding transmission.

FIGS. 20–22 show block out control schematics for preventing actuation of the windows or midgate under certain conditions. FIG. 20 shows a block out control 470 in which a decision block 472 determines whether the midgate ajar switch is registering that the gate is closed. If the gate is closed, then the window may be adjusted via mechanical or electrical means (step 474). If the midgate is ajar, then operation of the window would be disabled electrically or mechanically until the midgate is closed (step 476) and the ajar switch registers the midgate panel being in a closed position. In this condition, window adjustment is enabled. This block-out control may be achieved by switches which close a circuit to enable power to flow to a window motor when the midgate is sensed to be in a closed position. Alternatively, a body controller could be used.

FIG. 21 illustrates a schematic block out control 480 which prevents window movement when a pass-through closure is not closed. At block 482, a decision is made whether an ajar switch in a pass-through latch registers that the pass-through closure (such as closures 338, 340 of FIG. 13*b*) is in a closed position. If the ajar switch in the pass-through latch is registering that the pass-through closure is closed, then the window may be moved up or down (block 486). If the ajar switch in the pass-through latch is not registering that the pass-through closure is closed, then the window actuation would be disabled mechanically or electrically until the pass-through closure is closed (step 488). This block-out control may be achieved by switches which close a circuit to enable power to flow to a window motor when the pass-through closure is sensed to be in a closed position. Alternatively, a body controller could be used.

FIG. 22 schematically illustrates a block out control 490 which prevents window or midgate adjustment unless a corresponding vehicle transmission is in neutral or park. At the decision block 492, a decision is made whether the transmission is in neutral or park. If the transmission is in neutral or park, the window or midgate may be adjusted electrically or mechanically (block 494). If the transmission is not in neutral or park, then the window and/or midgate panel would be disabled until the transmission gearing is changed to neutral or park (block 496). An electrical circuit would provide an appropriate input to a body control module to enable unlatching only when the vehicle is in park or neutral.

The ajar switch may be in a latch or may be a separate system such as a light switch like that used in a refrigerator. The midgate may also have a latch that mechanically shows that the midgate is ajar. When the latch is moved into a primary position (latched) an indicator is not visible. This indicator may be a painted strip on the latch fork bolt that is a bold color, such as red, orange, etc. When the latch is moved to an unlatched position, the indicator would be exposed.

Supporting disclosure relating to the blockout or interlock controls and other features may also be found in commonly owned U.S. Pat. No. 5,934,727; 6,260,916; 6,416,104; 6,478,355 and 6,513,863, which are hereby incorporated by reference in their entirety.

Turning to FIGS. 23 and 24, a sealing panel 500 is shown for use with a hard cargo cover 502 on a vehicle body 504. As shown, the body 504 includes a midgate panel 506 which is pivotable between the upright position shown in FIG. 23 and the folded down position shown in FIG. 24. The window 508 is lowerable into the midgate panel 506 from the upright position shown in phantom in FIG. 23 to the lowered position shown (in solid lines) in FIG. 23. When not in use, the sealing panel 500 is stored in a recess 510 formed in the midgate panel 506. The sealing panel may be any material, such as plexiglass, opaque plastic, etc.

When the midgate panel 506 and window 508 are pivoted to the folded down position shown in FIG. 24, long cargo may extend from the rear cab 512 into the passenger compartment 514. In this circumstance, the window opening, which was previously occupied by the window 508 shown in phantom in FIG. 23 is opened. In order to seal off this opening, the sealing panel 500 may be secured between a forward edge of the cargo cover 502 (such as by a latch) and an edge 518 of the window opening to seal the window opening. The top edge of the sealing panel 500 would be pushed into the glass run channels 520, and the lower edge of the sealing panel 500 would include a flange and weather strip 522.

Accordingly, when the midgate panel 506 is folded to the collapsed position shown in FIG. 24, long cargo may be stored inside the vehicle body, and the sealing panel 500 may be attached in the window opening as shown in FIG. 24 to prevent unwanted water from entering the passenger compartment, such as in rain or when passing through a car wash.

The invention also provides a method of installing a midgate panel in an opening between adjacent compartments in a vehicle. The method includes the steps of:

a. assembling the midgate panel to a structural ring such that the midgate panel is hinged to the ring for movement between open and closed positions; and b. installing the ring and attached midgate panel in the opening between adjacent compartments.

The method may also include assembling a window into the ring above the midgate panel prior to the installing step. The method may also include assembling a cross-bar and at least one door latch to the door and cross-bar to hold the door in a closed position and assembling a window latch to the ring to hold the window in a closed position.

Each of the features of the invention described previously may be combined with the structural rings or any other feature shown. While the best modes for carrying out the invention have been described in detail, those familiar with the art to which this invention relates will recognize various alternative designs and embodiments for practicing the invention within the scope of the appended claims.

What is claimed is:

1. A vehicle body having a first compartment for carrying passengers or cargo and a second compartment for carrying cargo rearwardly adjacent the first compartment, the body comprising:
   a plurality of body components defining an opening between the first and second compartments; and
   a structural support ring attached in said opening and including a pivotable midgate panel preassembled to the support ring to ease installation, at least one hinge pivotally connecting the midgate panel to the support ring, and at least one latch selectively securing the midgate panel in an upright closed position.

2. The body of claim 1, wherein said support ring is welded to said body components in the opening.

3. The body of claim 1, wherein said midgate panel is connected inside a lower portion of the ring, and the ring further comprises a cross-bar and a window connected inside an upper portion of the ring, and a window latch operative to hold the window closed in the ring.

4. The body of claim 1, further comprising a window connected in said opening above the support ring.

5. The body of claim 1, wherein said support ring is a one-piece steel ring which is bolted to said body components.

6. The body of claim 3, further comprising a cross-bar extending across the ring between the midgate panel and the window.

* * * * *